United States Patent [19]

Kuwayama et al.

[11] 4,309,093
[45] Jan. 5, 1982

[54] CAMERA HAVING A DIFFUSING PLATE WITH ROTATIONALLY ASYMMETRIC LIGHT DIFFUSION PROPERTY

[75] Inventors: Tetsuro Kuwayama; Takashi Suzuki; Kazuya Matsumoto, all of Yokohama, Japan

[73] Assignee: Canon Kabushiki Kaisha, Tokyo, Japan

[21] Appl. No.: 138,984

[22] Filed: Apr. 10, 1980

Related U.S. Application Data

[63] Continuation-in-part of Ser. No. 971,432, Dec. 20, 1978, abandoned.

[30] Foreign Application Priority Data

Dec. 28, 1977 [JP] Japan ................................ 52-160126

[51] Int. Cl.³ .......................... G03B 7/00; G03B 13/02
[52] U.S. Cl. ...................................... 354/59; 354/155; 354/199
[58] Field of Search .................. 354/23 R, 42, 54–56, 354/59, 155, 219, 199–201, 224, 225; 355/71; 350/3.70, 3.81, 3.82, 188, 3.72, 127, 128, 431

[56] References Cited

U.S. PATENT DOCUMENTS

| | | | |
|---|---|---|---|
| 3,698,810 | 10/1972 | Bestenreiner et al. | 355/71 |
| 3,718,078 | 2/1973 | Plummer | |
| 4,027,327 | 5/1977 | Harada | 354/224 X |
| 4,109,257 | 8/1978 | Okuno et al. | 354/23 R |
| 4,121,234 | 10/1978 | Altman et al. | 354/155 X |

Primary Examiner—L. T. Hix
Assistant Examiner—W. J. Brady
Attorney, Agent, or Firm—Fitzpatrick, Cella, Harper & Scinto

[57] ABSTRACT

A photographic camera provided with a finder system having, at the focal plane of the imaging lens, a light diffusing plate having a rotationally asymmetric diffusion property or a rotationally asymmetric angular distribution of diffused light. Such a camera is provided with a photosensor for light measuring therewithin. The diffusing plate diffuses light so that the photosensor receives an appropriate quality of light, and so that the light is distributed in the manner that the operator can easily focus the camera.

10 Claims, 31 Drawing Figures

CAMERA HAVING A DIFFUSING PLATE WITH ROTATIONALLY ASYMMETRIC LIGHT DIFFUSION PROPERTY

BACKGROUND OF THE INVENTION

1. Field of the Invention

This is a continuation-in-part application from U.S. Ser. No. 971,432 filed on Dec. 20, 1978, now abandoned.

The present invention relates to a camera having a diffusing focus plate, and more particularly to a camera utilizing a diffusing focus plate of a rotationally asymmetric angular distribution of diffused light.

2. Description of the Prior Art

In recent years there have been made various proposals for providing a brighter viewing field in the camera finder. For example in the U.S. Pat. No. 3,718,078 there is disclosed a smoothly granulated diffusing focus plate for the above-mentioned purpose.

However such diffusing plates used in the conventional cameras are provided with a rotationally symmetric angular distribution of the diffused light.

A diffusing plate for use in the finder system of a single-lens reflex camera is required to perform a function of confirming an object in the viewing field, a function of focusing the imaging lens to an object and also a function, in case of a camera conducting light measurement in the vicinity of the eyepiece of the camera, of directing a part of the light entering the diffusing plate toward a light-receiving element. These three functions are mutually closely related, and an improvement in the performance of either one function inevitably results in a sacrifice of the performance of other two functions if the angular light distribution is limited to being rotationally symmetric. For example an improvement in the luminance of the image in the finder inevitably deteriorates the accuracy of range finding and reduces the amount of light introduced into the light-receiving element.

The present invention is to realize a diffusing plate for use in a camera capable of providing a brighter viewing field, a higher accuracy of range finding and a sufficient amount of light introduced to the light-receiving element by employing a rotationally asymmetric angular distribution of the diffused light instead of the conventional rotationally symmetric light distribution.

When a conventional diffusing plate having the rotationally symmetric distribution is used with a rectangular finder port (eye piece), and the diffusion distribution is matched to the short side of the rectangular eye piece, the image of the object seen through the finder is dark at the marginal area when the eye is moved along the long side thereof. If, on the contrary, it is matched to the long side, the brightness of the image is constant, but the average brightness is low. This is because the light is diffused wastefully (not contributable to image observation), so that the effective quantity of light is low.

According to the present invention, the diffusion plate having the distribution property which is rotationally asymmetric, and which is different in two orthogonal directions, is used. By doing so, the present invention provides a camera that can provide a constantly bright image over the entire field of the view finder. A diffusing plate of a rotationally asymmetric angular light distribution, though not intended for use in a camera, is already disclosed for example in U.S. Pat. No. 3,698,810.

SUMMARY OF THE INVENTION

The object of the present invention, therefore, is to provide a camera utilizing a diffusing plate with a rotationally asymmetric angular distribution of the diffused light.

Another object of the present invention is to provide a camera whose finder image is bright, and whose focusing operation is accurate, and also which can supply an appropriate quantity of light to the photodetector located outside the optical axis.

A further object of the present invention is to provide a camera whose finder image is seen brightly irrespective of the place of the eye relative to the finder.

DESCRIPTION OF THE PREFERRED EMBODIMENTS

Figure 1:
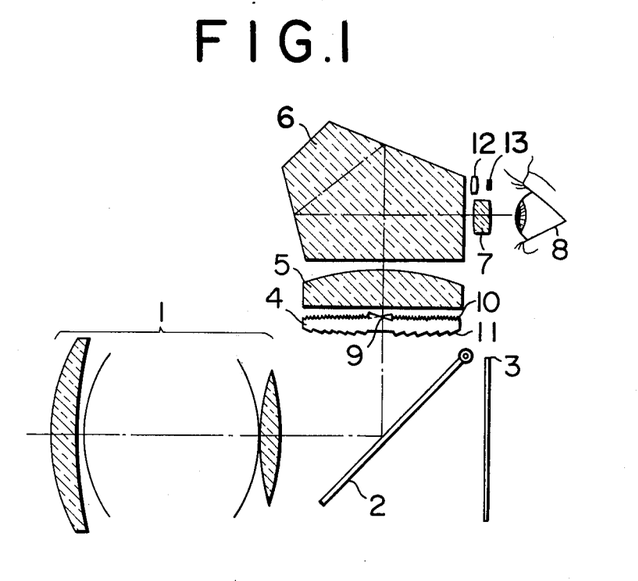
FIG. 1 is a view of the optical arrangement of a conventional camera.

Referring to FIG. 1 showing an embodiment of the use of a diffusing plate in a photographic camera, the image of an object formed by an imaging lens 1 is focused, through a movable mirror 2 and a Fresnel lens 11, on a diffusing plane 10 of a focus plate 4. Said diffusing plane is usually provided, in a central portion thereof, with split prisms or microprisms 9, and the focusing operation is performed by regulating the imaging lens while watching, with a human eye 8, the image formed on said prisms. Upon completion of said focusing operation a shutter button is actuated to elevate the movable mirror 2 whereby the image of the object is exposed to a photographic film 3 located in a position conjugate with said diffusing plane with respect to said mirror 2.

Above an eyepiece 7 positioned at an emerging face of a pentagonal prism 6 there are provided a condenser lens 12 and a photodetector 13 for measuring the amount of light diffused by diffusing plane.

Figure 2:
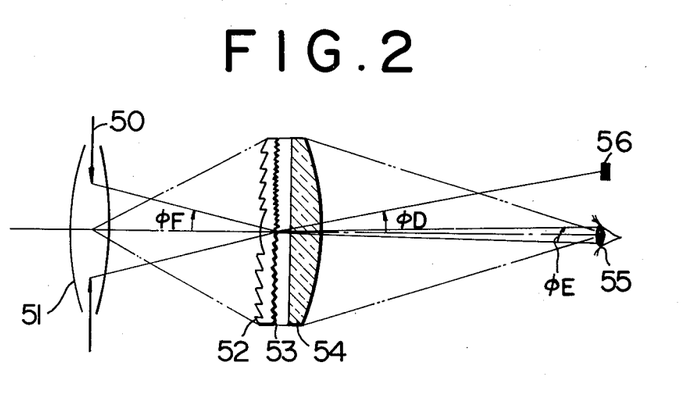
FIG. 2 is a schematic view showing the optical system in FIG. 1.

The optical system shown in FIG. 1 can be schematically represented as shown in FIG. 2, wherein the pupil 50 of an imaging lens 51 and the pupil 55 of the observer are in an approximately conjugate relationship with respect to the Fresnel lens 52 and the condenser lens 54. Thus, out of the light flux emerging from the center of said pupil 50 of the lens 51 a fraction not diffused by the diffusing plane 53 enters the pupil 55 of the observer. Also the light flux emerging from the edge of the pupil 50 has to be diffused by an angle $\phi_F$ in order to enter said pupil 55.

Therefore, such a portion of the light incident on the diffusing plane 53 from the pupil 50 that is diffused with the diffusion angle corresponding to the incident angle, is incident on the pupil 55 of the observer's eye, the diffusion angle being between 0 and $\phi_F$ irrespective of the incident place.

On the other hand, in case the photodetector 13 is located close to the eyepiece 7 as shown in FIG. 1, the corresponding position of said detector is also close to the pupil 50 in FIG. 2, so that, out of the light flux emerging from the center of the pupil 50, a fraction diffused by the diffusing plane 53 by an angle $\phi_D$ enters the photodetector 56 regardless of the incident position on said diffusing plane.

Consequently it is enough to consider an image present on the optical axis in order to discuss the image luminance, focusing accuracy and light measuring performance, and it will be understood that the same conclusion is applicable regardless of the position of the image on the diffusing plate.

In a single-lens reflex camera an angle $\phi_F$ viewing the exit pupil of the imaging lens from the diffusing plate is satisfactorily larger than an angle $\phi_E$ viewing the pupil of the observer from the diffusing plate. In such case the pupil 55 of the observer receives a light flux emerging from the exit pupil 50 of the imaging lens and diffused by the diffusing plane 53 by an angle not exceeding the angle $\phi_F$ (more exactly not exceeding an angle $\phi_F+\phi_E$). This fact signifies that a fraction diffused in excess of the angle $\phi_F$ does not contribute to the image luminance.

Consequently the luminance of the image observed through the finder system is related with the diffusing property of the diffusing plate in the following manner:

(i) In order to increase the luminance of the image, it is necessary to maximize the amount of light diffused within the angle $\phi_F$ which is determined by the f-number of the lens by the following equation: $\phi_F=\arcsin(\frac{1}{2}\cdot\text{f-number})$ and which is for example 7° for a lens with an f-number 4.

Also for accurate focusing it is necessary that the peripheral portion of an out-of-focus point image, such peripheral portion being formed of a light flux diffused by the diffusing plate to the angle $\phi_F$ or an angle close thereto. Thus a following condition is required for achieving a high accuracy in the focusing:

(ii) For improving the focusing accuracy it is required to increase the amount of light diffused with an angle equal to or slightly smaller than $\phi_F$.

Also it is desirable to introduce as much light as possible to the light measuring system in order to enable light measurement in a dark situation. Therefore:

(iii) In order to direct a sufficient amount of light toward the light measuring system even when the image lens is of a high f-number, it is necessary to increase the amount of light diffused into an angle $\phi_D$ corresponding to the light measuring system in the diffusing property.

The above-mentioned three requirements are mutually contradicting and cannot be satisfied simultaneously in case of an angular light distribution having rotational symmetry. However, it is rendered possible to simultaneously satisfy these requirement to a certain extent by employing a rotationally asymmetric light distribution of the diffused light in consideration of a fact that the photodetector is only located in a certain angular position with respect to the eyepiece.

Figure 3:
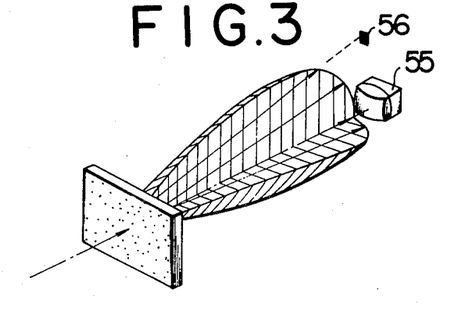
FIG. 3 is a perspective presentation of the light diffusing property of the diffusing plate of the present invention.

FIG. 3 shows a perspective presentation of the light distribution emerging from a diffusing plate having a rotationally asymmetric angular light distribution when a light flux of a small angular spreading from a lens with a high f-number enters said diffusing plate, wherein the diffusion is achieved in such a manner as to effectively direct the light flux to the eyepiece and to the photodetector located thereabove and to minimize the diffusion in other directions.

Figure 4:
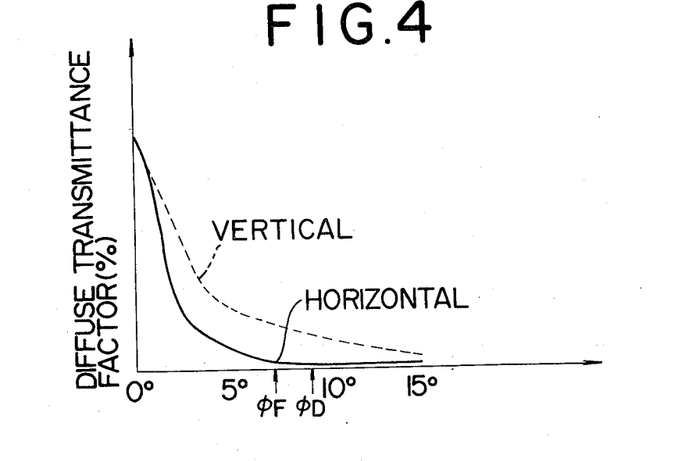
FIG. 4 is a chart showing the light diffusing property of an ideal diffusing plate.

FIG. 4 shows the diffusion property in a vertical plane including the optical axis and the light-receiving element in FIG. 3 and a horizontal plane therein respectively by the broken line and the full line, wherein the ordinate and the abscissa respectively representing the diffuse transmittance and the diffusion angle. As observed therein said diffusing plate has a higher diffuse transmittance in said vertical plane than in the horizontal plane. Said diffuse transmittance indicates the ratio of the amount of light diffused into a small solid angle with respect to the amount of incident light. As the result of measurements conducted on the various diffusing plates prepared by the processes to be explained later, it has been identified that a satisfactory result is obtained if the diffuse transmittance in a diffusion angle range of 14° to 15° in the vertical plane is larger by approximately 10% than that in the horizontal plane.

With a camera having a smaller f-number, the desirable distribution characteristics is a little different from that shown in FIG. 4, but by using a rotationally asymmetric diffusion plate, an appropriate quantity of light can be led to the photodetector.

For increasing the luminance in the finder it is necessary to concentrate, as far as possible, the energy inside the angle $\theta_F$ to be determined by the f-number of the lens, but it is in fact not possible to maintain a relatively large amount of light up to a certain angle and to reduce the diffusion to zero beyond said angle. Consequently an increase in the luminance of the finder system inevitably increases the amount of light around the diffusion angle 0°, thus resulting in a lower accuracy of the focusing. However in a diffusing plate of a diffusing property shown in FIGS. 3 and 4, there is obtained a sufficient light diffusion at least in the vertical direction so that a sufficiently large blur can be obtained at least in the vertical direction to satisfactorily allow focusing operation. In the arrangement of FIG. 3, the image blur appears in the vertical direction as the photodetector is located above the eyepiece, but, in consideration of the human eye characteristics, a higher focusing accuracy can be expected if the photodetector is located in a lateral direction of the eyepiece and the diffuse transmittance is rendered higher in said direction to obtain an image blur in said lateral direction.

Figure 28A:
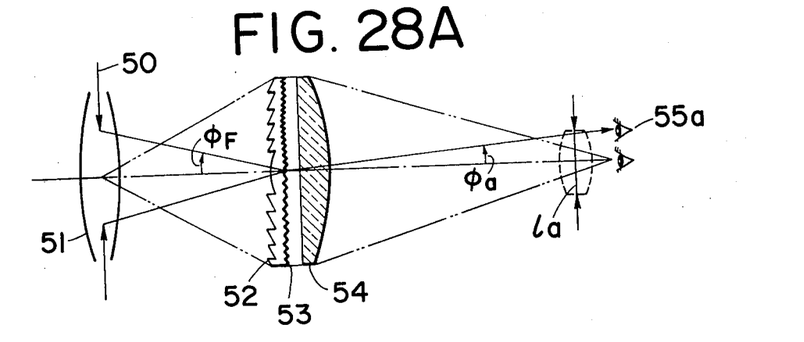
FIGS. 28A and 28B are respectively a schematic material sectional view and a schematic horizontal sectional view showing the optical system of the second embodiment.
Figure 28B:
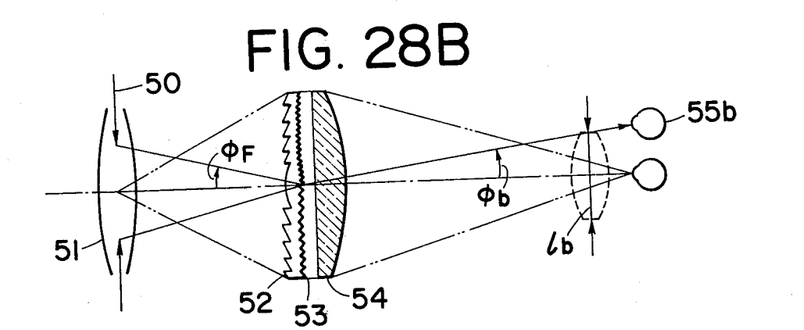
Figure 29:
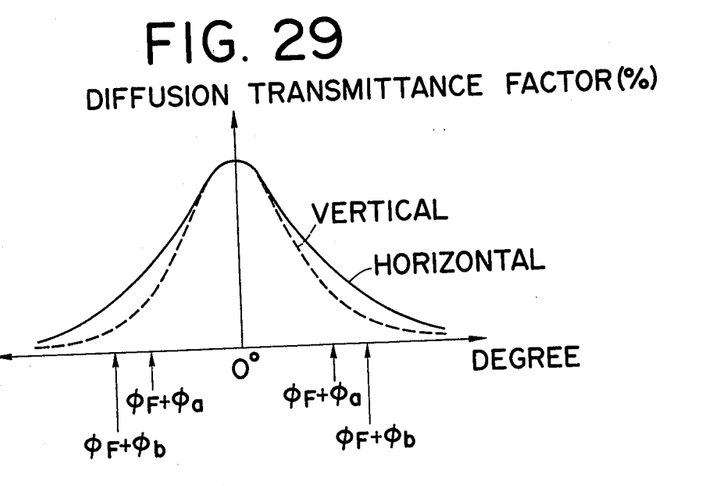
FIG. 29 is a chart showing the light diffusing property of an ideal diffusing plate.

The present invention is effective in a camera that has a non-circular finder port. Generally, the finder port of a camera is rectangular. A schematic vertical sectional view of such a camera is shown in FIG. 28A, and a schematic horizontal view thereof is shown in FIG. 28B. In FIG. 28A, when the observer's eye is moved, relative to the view finder, vertically to the edge 55a, the diffused light inclined $\phi_a$ with respect to the optical axis incident on the pupil of the observer. The angle $\phi_a$ is generally determined by the length la of the short side of rectangular shape. When the observer's eye is moved horizontally to the edge 55b, as shown in FIG. 28B, the light inclined $\phi_b$ ($>\phi_a$) is incident on the pupil of the observers eye. The angle $\phi_b$ is generally determined by the length $l_b$ ($>l_a$) of the long side. Because of the similar discussion as made with respect to the foregoing embodiment, when the size of the finder port and the movement of the eye are strictly considered, it is needed to diffuse the light inside of $\phi_F + \phi_a$ (or $\phi_b$), in order to make it possible that the bright image can be observed at any place in the field. Also, the diffusion characteristics relating to accuracy of focusing depends on $\phi_a$ or $\phi_b$. Therefore, if a diffusion plate having the conventional rotationally symmetric diffusion characteristics is used, and if the diffusion plate has the diffusion characteristics depending on $\phi_a$, the image suddenly becomes dark when the observer's eye is moved to a horizontal end. If, on the contrary, the characteristics are made dependent on $\phi_b$, the brightness of the image does not change, depending on the location of the eye, but the image is dark as a whole. FIG. 29 shows diffusion characteristics suitable to such a diffusion plate. The diffusion characteristics in the horizontal direction and the vertical direction are different, and it is desirable that the curvatures are symmetric with respect to the direction of 0°. The camera provided with such a diffusion plate can provide a bright image whose brightness is independent of the place of the observer's eye.

Figure 5:
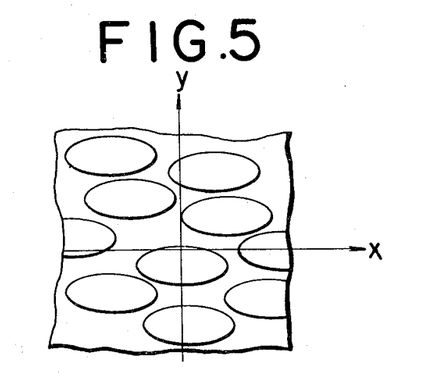
FIG. 5 is a view of the surface shape of the diffusing plate of the present invention.
Figure 6A:
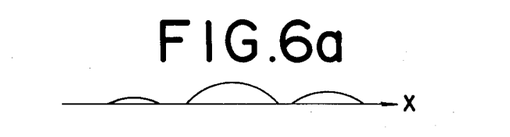
FIGS. 6A and 6B are views showing the cross sections of the diffusing plate shown in FIG. 5.
Figure 6B:
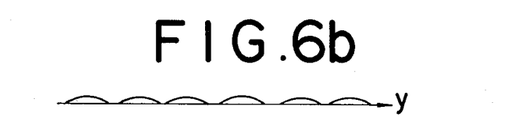

As an embodiment of such diffusing plate mentioned in FIG. 4 or FIG. 29 there can be mentioned an arrangement of lenslets each of a rotational ellipsoid surface as shown in FIG. 5. FIGS. 6A and 6B respectively show the cross sections of the diffusing plate shown in FIG. 5 respectively in the x- and y- direction wherein the difference in the radii of curvature in said directions results in different declining behaviors of the diffuse transmittance in said directions. The diffusing plate composed of such lenslets has a superior uniformity in comparison with the conventional diffusing plates, thus being free from black spot noises even when the lens is used with a small diaphragm aperture.

There can be proposed various processes for producing such diffusing plate with a rotationally asymmetric diffusing property.

For example rotationally asymmetric surface irregularities by forming spherical irregularities on a soft plastic metal foil such as copper with a known method such as sand grinding or glass bead blasting, and by stretching thus formed irregularities in one direction.

It is furthermore possible to produce such diffusing plate with a rotationally asymmetric diffusing property by transferring original surface irregularities for example onto a silicon rubber plate which is subsequently stretched in one direction and used as a mold for producing said diffusing plate.

Furthermore, a diffusing plate in which the diffusing property in the vertical direction is different from that in the horizontal direction can be obtained by sand grinding, commonly employed in producing conventional matted diffusing plates, in one direction for example with a brush instead of conventional rotational grinding.

In the following there will be explained certain examples of the process for producing a diffusing plate provided with a rotationally asymmetric angular distribution of the diffused light as explained in the foregoing.

Figures 7, 8:
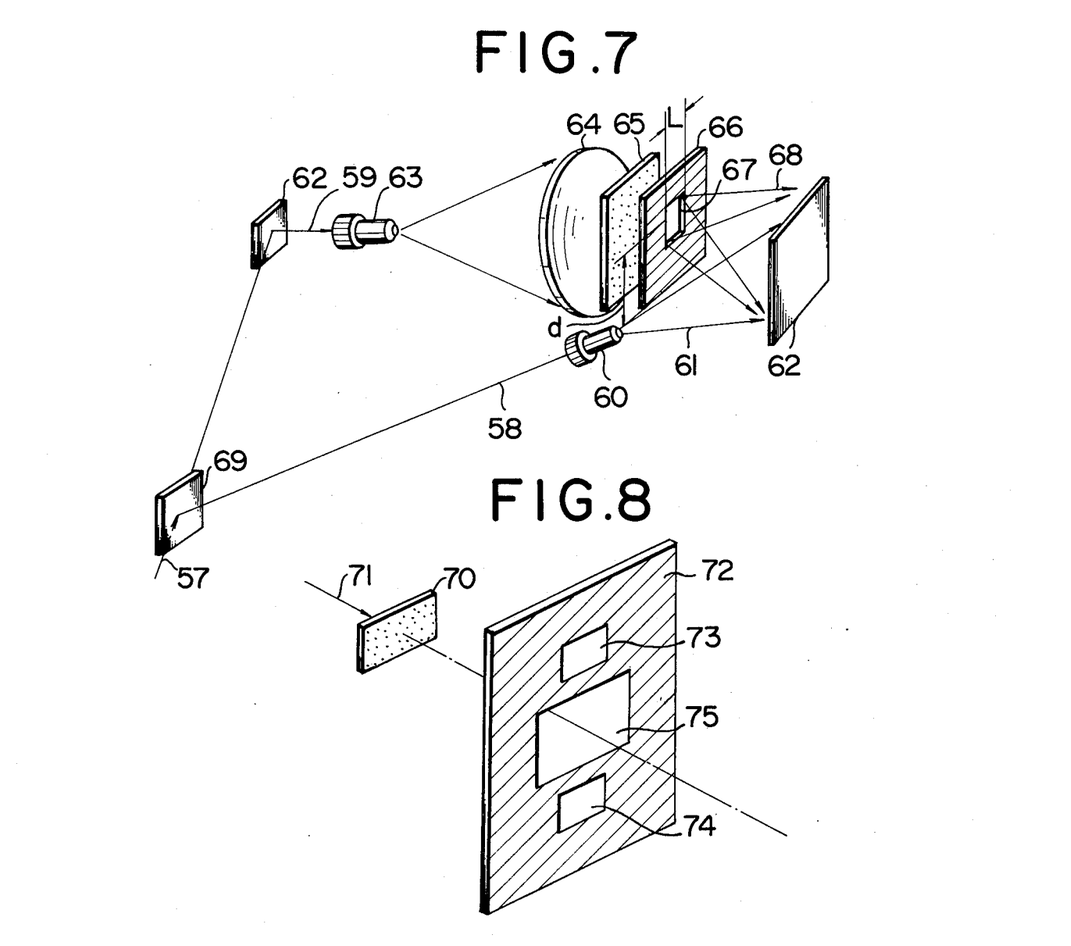
FIG. 7 is a view of an optical system for producing the diffusing plate of the present invention.
FIG. 8 is a view showing the light distribution obtained by introducing a monochromic light to the diffusing plate obtained by the optical system shown in FIG. 7.

Referring to FIG. 7 showing an example of the process for producing such diffusing plate, utilizing a holographic technology, the light 57 from a coherent light source such as a laser is split by a half-reflecting mirror 69 to form a reflected light beam 58 which is spread by a microscope objective lens 60 thereby forming a spherical wave 61 entering a photosensitive plate 62, and a transmitted light 59 which enters a diffusing plate 65 after reflection by a mirror 62 and passing through lenses 63 and 64 constituting a beam expander, the beam diffused by said diffusing plate 65 being also directed to said photosensitive plate 62 as a beam 68 passing through an aperture 67 of a light shielding plate 66 to form a speckle pattern on said photosensitive plate 62. Said beams 61 and 68 respectively function as a reference light and an object light to cause optical interference on the photosensitive plate 62 thereby forming a hologram thereon. The above-mentioned photosensitive plate can be of any type capable of recording the interference stripes in the form of a phase hologram with surface irregularities. Such hologram can be obtained for example by subjecting a silver halide photosensitive material to exposure, development and bleaching (for example R-10 bleaching method) to form surface irregularities thereon, by exposing a photoresist, a photopolymer or a thermoplastic material to said beams thereby directly forming surface irregularities corresponding to the light intensity distribution, or by recording the light intensity distribution on a silver halide recording material in the form of transmittance distribution and reprinting thus recorded distribution for example on a photoresist to obtain corresponding surface irregularities.

FIG. 8 shows a state of illuminating thus obtained phase hologram 70 with a monochromatic light beam 71, to form a reproduced image 73, a conjugate image 74 and an auto-correlation image 75 of the object (aperture 67 in FIG. 7) on a screen 72. In the actual use as the diffusing plate in combination with white light, said images are blurred by the spectral dispersion.

Figure 9:
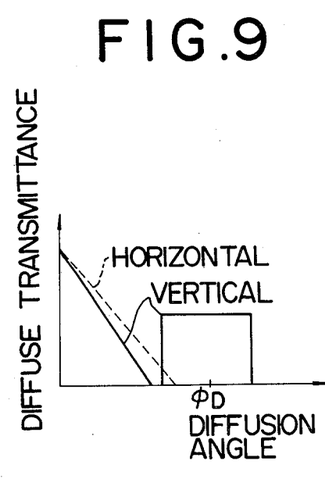
FIGS. 9 and 10 are views showing the light diffusing property for a monochromic light and a white light of the diffusing plate obtained by the optical system shown in FIG. 7.
Figure 10:
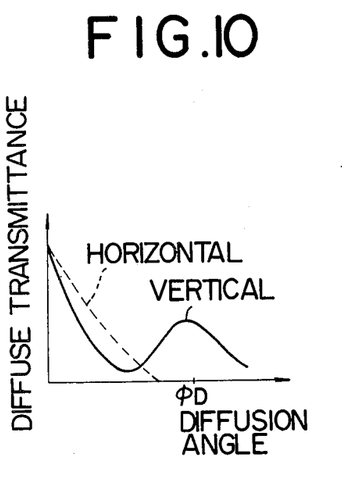

These relationships are shown in FIGS. 9 and 10 which respectively show the diffusion property for a monochromatic light and for a white light.

As is well known in the field of holography, on the photosensitive material 62 of FIG. 7, there are complicated interference fringes by the reference light 61 and the light diffused by the diffusion plate 65 within the aperture 67, also there are interference fringes by the light diffused at each point of the diffusion plate 65. When the hologram is developed and illuminated by a monochromatic light, the diffraction light by the former interference fringes forms the reproduced image 73 of the aperture 67 and the conjugated image 74 thereof. The latter interference fringes generate the light 75 having an intensity distribution of the type of auto-correlation function of the aperture 67. Therefore, the distributions characteristics are such as shown in FIG. 9. A triangular light distribution corresponding to the auto-correlation function with the straight direction (light distribution angle 0°), and a flat distribution corresponding to the reproduced image of the aperture results.

When white light is incident, the diffraction light is differently directed if the wavelength is different, so that the distribution characteristics is blurred than that of FIG. 9, as shown in FIG. 10.

The diffusion property in FIG. 10 is characterized in that the diffuse transmittance in the vertical direction, which is the direction of the carrier of said hologram, is larger than that in the horizontal direction, and that a peak is obtained in the direction of the primary diffraction of the hologram. Thus, in case of conducting light measurement with the light diffused from the diffusing plate, a larger amount of light can be received if the light-receiving element is positioned in the angular direction corresponding to said peak of diffusion.

The above-mentioned difference in the diffusion property between two directions is determined by a ratio between the lateral length L of the aperture 67 perpendicular to the direction of the carrier and a distance d from the center of said aperture 67 to the emerging point of the reference light.

In the above-mentioned embodiment the diffuse transmittance in the vertical direction is larger than that in the horizontal direction since L<d.

It is also possible to achieve an additional control on the diffusion property by placing a density fileter of a suitable transmittance distribution at said aperture 67.

In the ordinary preparation of a hologram for reproducing an image of an object it is required that the auto-correlated image formed by the zero-th order light does not overlap with the reproduced images formed by the first order refraction as shown in the foregoing embodiment, but this requirement is not necessarily essential for the purpose of the present invention. In certain cases the peak in the diffusion shown in FIG. 10 may even be omitted. In the following there will be explained a process for producing a diffusing plate not showing such diffusion peak.

Figure 11:
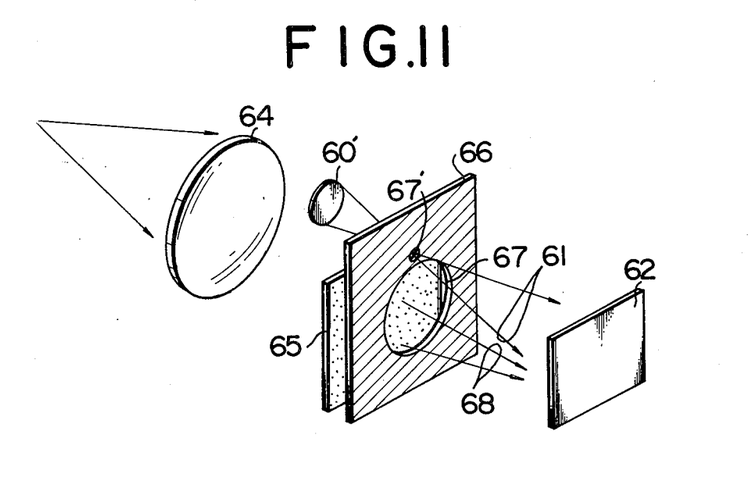
FIG. 11 is a view showing another process for producing the diffusing plate of the present invention.
Figure 12:
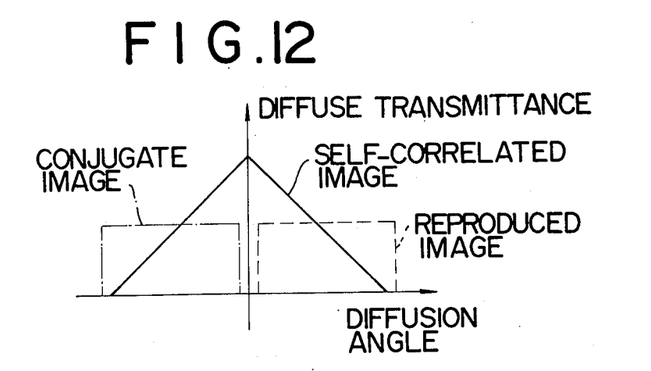
FIG. 12 is a chart showing the reproduced image obtained by monochromic light introduced to the diffusing plate prepared according to FIG. 7.

Referring to FIG. 11 a part of the light beam coming from a collimeter lens 64 is focused, by a condenser lens 60', on a small hole 67' provided close to the aperture 67 and reaches the photosensitive plate 62 as a reference light 61. The remaining beam from the collimeter lens 64 is diffused by the diffusion plate 65, then passes the aperture 67 and reaches the photosensitive plate 62 as an object light 68. As the distance between the aperture and the emerging point of the reference light is small in comparison with the dimension of said aperture 67 in this embodiment, the auto-correlated image and the reproduced image obtained by illuminating thus prepared hologram with a monochromatic light overlaps each other as shown in FIG. 12 so that the diffusion peak as shown in FIG. 10 is no longer observable under illumination with a white light. It is also possible to obtain a similar hologram by utilizing an aperture 67 of an oval ring shape and introducing the reference light beam through a small hole 67' provided in the approximate center of said over-shaped aperture.

Figure 13:
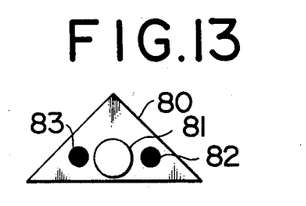
FIGS. 13 and 14 are views showing the mutual relationship between the eyepiece and the light-receiving element.

In the foregoing embodiments the photodetector is placed above the eyepiece, and the diffusing plate is designed to have a higher diffusing ability in the vertical direction. Such diffusing plate may be rotated by 90° if, as shown in FIG. 13, photodetectors 82, 83 are positioned in the lateral direction of an eyepiece 81 at the emerging face 80 of the pentagonal prism.

Figure 14:
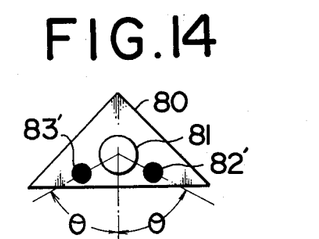
Figure 15:
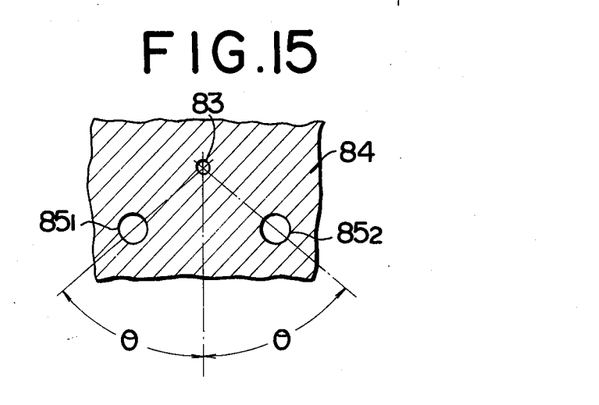
FIG. 15 is a view of a light shielding plate for producing diffusing plate to be employed in the light measuring system shown in FIG. 14.

Also in case, as shown in FIG. 14, photodetectors 82', 83' are positioned in a direction of an angle θ to the vertical line passing through the center of eyepiece 81, it is possible to concentrate the light on the photodetectors by placing the aperture for forming the hologram in such a manner as to obtain the reproduced images corresponding to the positions of said photodetectors. FIG. 15 shows the positional relationship between the point source 83 of the reference light and the apertures $85_1$, $85_2$ in the light shield plate 84.

In the foregoing explanation there has been shown an optical system of semi-Fourier conversion type for forming a hologram, but it will be readily understood that any other optical system capable of providing a similar result can be employed for the same purpose.

Figure 16:
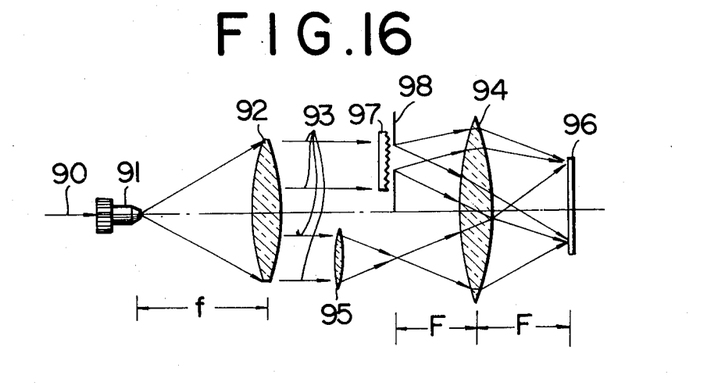
FIGS. 16 and 17 are views showing a process for producing the diffusing plate, utilizing a Fourier converted holographic method.

FIG. 16 shows a well known optical system for forming a Fourier conversion hologram, in which a laser beam 90 is converted, by means of a microscope objective lens 91 and collimating lens 92, into a parallel light beam 93, of which a fraction is focused by a small lens 95 of which focal point is placed on the front focal plane of a Fourier conversion lens 94, and again converted by said lens 94 into a parallel beam which enters a photosensitive plate 96 placed on the Fourier conversion plane.

The remaining fraction of said beam 93 is diffused by a diffusing plane 97 and a mask 98 and enters the photosensitive plate 96 through said lens 94. In this manner there is recorded a Fourier conversion hologram of said diffusing plate 97 and the mask 98 on said photosensitive plate 96.

Figure 17:
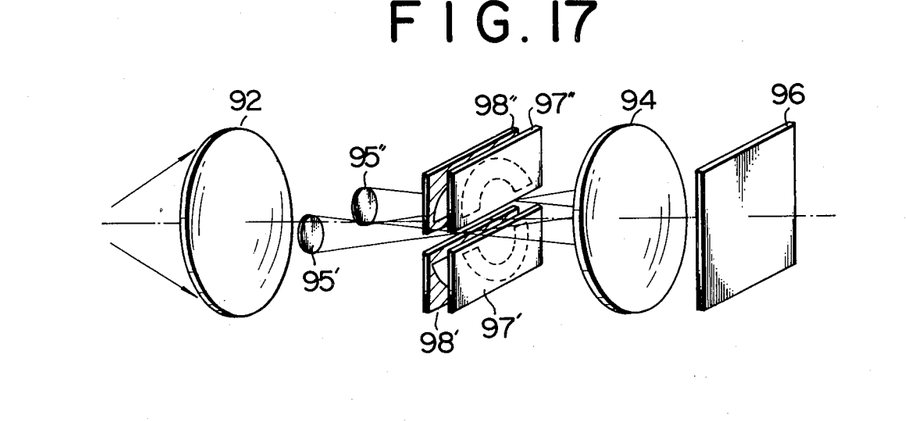

FIG. 18 shows another embodiment of utilizing two reference lights in a similar optical system, wherein two reference lights formed by small lenses 95', 95" are introduced to the photosensitive plate 96 through gaps between the masks 98', 98" and between the diffusing plates 97', 97".

Figure 18:
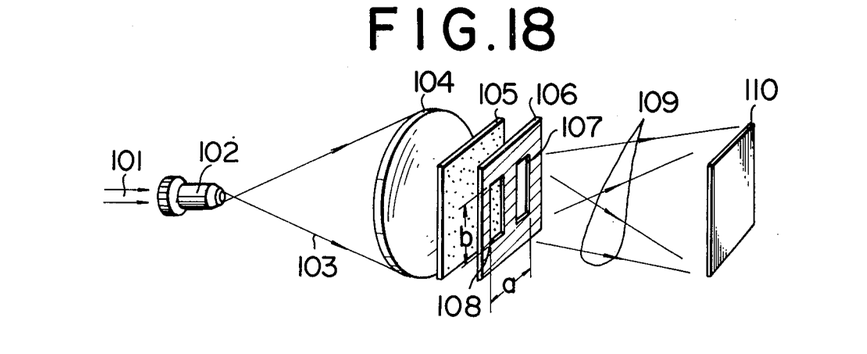
FIG. 18 is a view showing still another process for producing the diffusing plate of the present invention.

FIG. 18 shows still another process for producing the diffusing plate of the present invention, in which a laser beam 101 is converted by a microscope objective lens 102 into a divergent spherical wave front which is converted by a condenser lens 104 into a convergent spherical wave front for illuminating a diffusing plate 105, behind which provided are a mask 106 having two apertures 107, 108, whereby a speckle pattern determined by the shape thereof being formed on a photosensitive plate 110. A diffusing plate of a rotationally asymmetric light diffusion property can be obtained by recording said speckle pattern and converting said recording into a distribution of surface irregularities.

Figure 27:
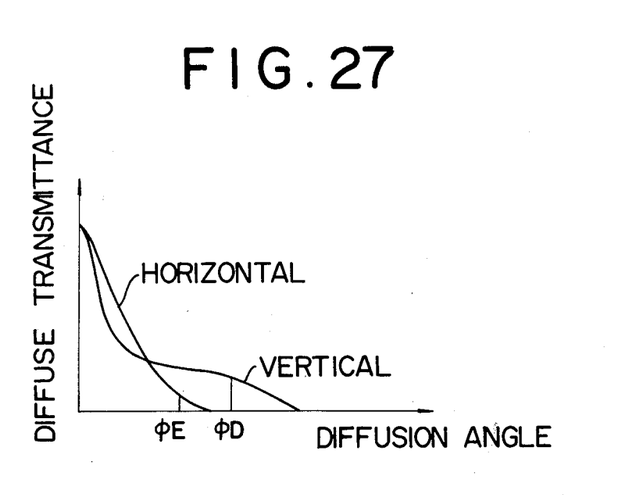
FIG. 27 is a chart showing the diffusion property of the diffusing plate prepared according to the process shown in FIG. 18.

The angular distribution of the diffused light in this case is determined by the shape of apertures in the mask 106 and can be approximately represented by the auto-correlation function of the shape of said apertures. Thus a higher diffuse transmittance at a larger diffusion angle can be achieved by enlarging the dimension of the apertures in the corresponding direction. FIG. 27 shows the diffusion property obtainable in case the horizontal dimension a of the double apertures shown in FIG. 18 is larger than the vertical dimension b thereof. The use of such diffusing plate of a diffusing property as mentioned above in combination with the photodetector placed in a direction showing a higher diffuse transmittance allows to obtain an ideal finder system assuring a brighter viewing-field, an elevated ranging accuracy and an increased amount of light supplied to the photo-detector. The surface configuration obtained by recording the speckle pattern of the present embodiment is composed of ideal lenslets as shown in FIGS. 5 and 6.

FIG. 4 shows an example wherein the distribution characteristics in the vertical and horizontal directions are not crossing, whereas, in the FIG. 27 example, they are not crossing. The reason why the desirable characteristics are not constant is that the f-number of the lens, the angle of measurement, and the needed distance-measurement performance vary the desired characteristics.

For example, the characteristics of FIG. 4 are suitable for the case where a lens of relatively small f-number is used, and the needed distance-measurement performance is relatively low. The characteristics of FIG. 27 are suitable for the case where a lens of relatively large f-number is used to provide a sufficient quantity of light with the photoreceptor element and the needed distance-measurement performance is relatively high.

Figure 19:
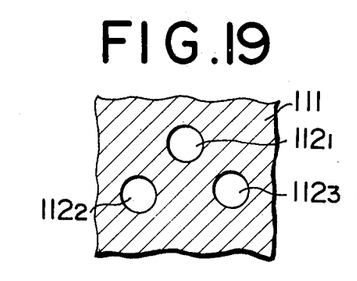
FIGS. 19 to 26 are views showing various shapes of the light shielding plate to be employed in the process shown in FIG. 18.
Figure 20:
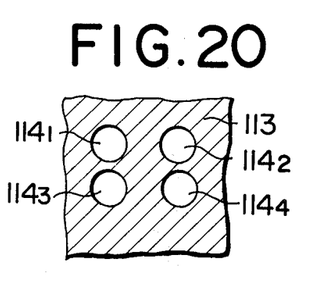
Figure 21:
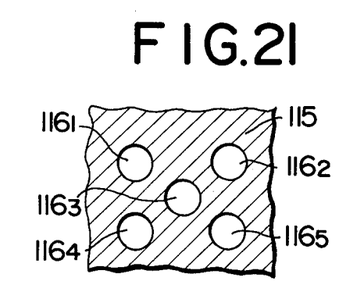
Figure 22:
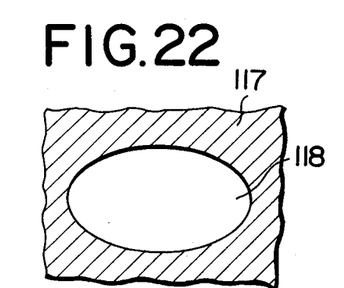
Figure 23:
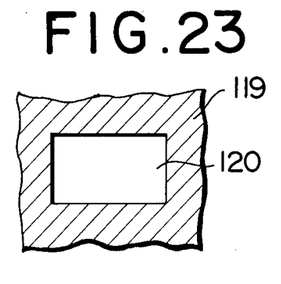
Figure 24:
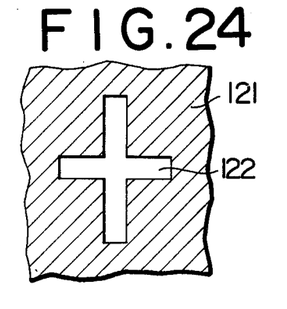
Figure 25:
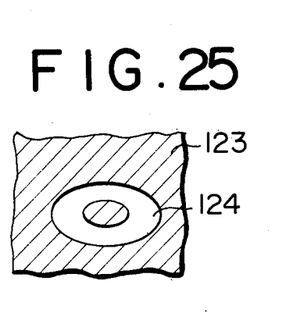
Figure 26:
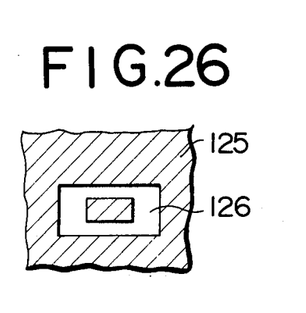

Though the embodiment shown in FIG. 18 utilizes two slits as the aperture for forming rotational asymmetry, similar assymetric diffusion can in principle be obtained also with other rotationally asymmetric apertures. More specifically, for the purpose of producing a diffusing plate utilizing a speckle pattern, there can be employed, in addition to the double slits shown in FIG. 18, other various apertures such as three holes shown in FIG. 19, four holes shown in FIG. 20, five holes shown in FIG. 21, an oval aperture shown in FIG. 22, a rectangular aperture shown in FIG. 23, a cross-shaped aperture shown in FIG. 24, an oval ring aperture shown in FIG. 25, or a rectangular frame-shaped aperture shown in FIG. 26 according to the desired diffusion property and the characteristics of the photosensitive plate to be used.

Among those, for the camera having non-round finder port, the diffusion plate using the aperture of FIGS. 22, 23, 25 or 26, is proper.

In any of these, the distribution characteristics in the planes including the optical axis and orthogonal with each other, are different, and the characteristics in the planes are symmetrical with respect to 0°.

Furthermore the diffusing plate of the present invention can be prepared by means of the kinoform technology which is a computed hologram. It is already possible within the known technology to calculate the phase distribution to be realized on the surface of diffusing plate in order to approximately a given desired form of the reproduced image or of the diffusion property.

Thus such diffusing plate can be prepared according to the following steps of:

(1) determining a desired diffusion property;

(2) dividing the surface of diffusing plate into plural sampling points of a suitable interval and calculating the phase to be given to each of said sampling points; and (3) preparing a phase plate meeting the results of calculation according to a suitable process.

In the above-mentioned procedure the preparation of the phase plate meeting the results of calculation can be achieved for example by developing and bleaching a silver halide photosensitive material or by direct exposure on a photoresist plate.

As detailedly explained in the foregoing, the present invention is to provide a camera finder assuring a brighter viewing field and an elevated ranging accuracy and effectively supplying a light flux to a photo-receiving element located outside the light flux of the finder by the use of a diffusing focus plate provided with a rotationally asymmetric angular distribution of the diffused light.

According to the present invention, the finder light is let to the entire finder effectively, and the bright image is always observed, and further, the accuracy of distance-measurement is high.

Also the diffusing plate prepared by a holographic or speckle pattern printing process described as the preferred embodiments of the present invention is provided with a surface configuration composed of lenslets which provide a sharper image with reduced black dot noises in comparison with the conventional finder screens of a uniformly matted surface.

It will also be understood that the surface configurations of rotationally asymmetric diffusing properties obtainable in the foregoing embodiments can be used as a mold, for example with electroplating thereon, for reproducing the identical configurations for example on an acrylic resin plate by compression or injection molding.

We claim:

1. A camera having a diffusing plate with a rotationally asymmetric light diffusion property comprising;
   an imaging lens forming a first optical path,
   a finder optical system forming a second optical path,
   a photosensitive member positioned at a focal plane in said first optical path,
   a diffusing plate positioned at a focal plane in said second optical path and having a rotationally asymmetric angular distribution property,
   a photo detecting means positioned out of the optical axis of said second optical path, and
   an exposure control means.

2. A camera according to claim 1, wherein said diffusing plate is adapted to provide a larger amount of diffused light in a plane including said photodetector and said optical axis than in another plane perpendicular to said plane and including said optical axis.

3. A camera according to claim 1, wherein said diffusing plate is adapted to provide a diffuse transmittance in a direction forming an angle of 14° to 15° to the direction of non-diffused light in said plane including the light-receiving element and said optical axis higher by at least approximately 10% than that in said another plane.

4. A camera according to the claim 1 wherein said diffusing plate is prepared by calculating a phase distribution required for obtaining a desired rotationally asymmetric angular distribution of the diffused light, and forming a surface configuration according to the result of said calculation.

5. A camera having a diffusing plate with a rotationally asymmetric light property comprising:
an imaging lens forming an image of an object,
a photosensitive member positioned at a focal plane of said imaging lens,
a finder optical system for observing the object,
a diffusing plate positioned at a second focal plane in said finder optical system and diffusing the incident light parallel to the optical axis of said finder optical system with a rotationally asymmetric angular distribution property in which the angular distribution in one plane including said incident light is different from that in another plane perpendicular to said one plane and including said incident light.

6. A camera according to claim 5, wherein each of said angular distributions in said planes is symmetric with respect to the ray axis of said incident light.

7. A camera according to claim 5, wherein said diffusing plate is prepared by optical recording of the intensity distribution of an interference of coherent lights or by reproduction of the thus prepared diffusing plate.

8. A camera having a diffusing plate with a rotationally asymmetric distribution property comprising:
an imaging lens forming an image of an object,
a finder optical system for observing the object,
a diffusing plate positioned at a focal plane of said imaging lens and having an arrangement of a plurality of lenslets each of a rotational asymmetric surface which has different powers in two perpendicular planes.

9. A camera according to the claim 8 wherein said diffusing plate is prepared by forming a rotationally asymmetric surface configuration on a mold and reproducing said surface configuration on said mold.

10. A camera according to claim 8 wherein said diffusing plate of a rotationally asymmetric angular distribution of the diffused light is prepared by forming a rotationally symmetric surface configuration on a plastic material, stretching said material in one direction to form a rotationally asymmetric surface configuration and reproducting by transfer said asymmetric surface configuration.

* * * * *